United States Patent [19]
Dhuse et al.

[11] Patent Number: 6,133,862
[45] Date of Patent: Oct. 17, 2000

[54] METHOD AND APPARATUS TO REDUCE ROW RESET NOISE IN PHOTODIODE

[75] Inventors: Jon M. Dhuse; Kevin M. Connolly; Mark A. Beiley, all of Chandler, Ariz.

[73] Assignee: Intel Corporation, Santa Clara, Calif.

[21] Appl. No.: 09/127,310

[22] Filed: Jul. 31, 1998

[51] Int. Cl.[7] ........................................... H03M 1/06
[52] U.S. Cl. ............................................. 341/118; 348/294
[58] Field of Search ............................... 341/118; 348/294

[56] References Cited

U.S. PATENT DOCUMENTS

| | | | |
|---|---|---|---|
| 5,289,286 | 2/1994 | Nakamura et al. | 348/223 |
| 5,892,540 | 4/1999 | Kozlowski et al. | 348/300 |
| 5,949,064 | 9/1999 | Chow et al. | 250/214 |
| 6,002,432 | 4/1999 | Merrill et al. | 348/241 |

*Primary Examiner*—Brian Young
*Assistant Examiner*—Jason L. W. Kost
*Attorney, Agent, or Firm*—Blakely, Sokoloff, Taylor & Zafman LLP

[57] ABSTRACT

What is disclosed is an apparatus for reducing row reset noise in photodiode based complementary metal oxide (CMOS) sensors. The apparatus uses at least one reference pixel for each row of pixels in a sensor array. Also, a reset noise elimination unit is provided to adjust the values received from the pixels in a particular row by an adjustment value determined from the reset values received from the reference pixels. Additionally, a method of using the apparatus is disclosed. The method has a step of providing a first reset signal to a row of pixels including the reference pixels. The method also reads out a first set of values from this row after integration. The method continues with providing a second reset signal to the row and a second set of values is read from the row. An adjustment value is calculated from the difference of the values which are read out from the reference pixels.

14 Claims, 6 Drawing Sheets

METHOD AND APPARATUS TO REDUCE ROW RESET NOISE IN PHOTODIODE

BACKGROUND OF THE INVENTION

1. Field of the Invention

This invention is related to providing higher quality digital image capture. Specifically, the invention provides a method and apparatus for reducing row reset noise in image sensors.

2. Description of Related Art

Image sensor circuits are used in a variety of different types of digital image capture systems, including products such as scanners, copiers, and digital cameras. The image sensor is typically composed of an array of light-sensitive pixels that are electrically responsive to incident light reflected from an object or scene whose image is to be captured.

The performance of an image capture system depends in large part on the sensitivity of each individual pixel in the sensor array and its immunity from noise. Pixel sensitivity is defined here as being related to the ratio of a change in the pixel output voltage to the photogenerated charge in the pixel. Noise here is defined as small fluctuations in a signal that can be caused by a variety of known sources. An image sensor with increased noise immunity yields sharper, more accurate images in the presence of environmental and other noise.

Improving the sensitivity of each pixel permits a reduction in exposure time which in turn allows the capture of images at a greater rate. This allows the image capture system to capture motion in the scene. In addition to allowing greater frame rate, higher pixel sensitivity also helps detect weaker incident light to capture acceptable quality images under low light conditions.

One way to increase pixel sensitivity is to increase the efficiency of the photodiode by changing the photodiode responsitivity characteristics. Doing so, however, can require deviating from a standard metal oxide semiconductor (MOS) integrated circuit fabrication process, thereby increasing the cost of manufacturing the image sensor circuit.

As stated above, integrated circuit imaging devices include an array of light detecting elements interconnected to generate analog signals representative of an image illuminating the device. Within such an integrated circuit, each complementary metal oxide semiconductor (CMOS) image sensing element contained in the integrated circuit contains a photodiode or phototransistor as a light detecting element. In one example, charge is collected in accordance with the intensity of light illuminating the photodiode or phototransistor. By storing charge, an analog signal is thus generated having a magnitude approximately proportional to the intensity of light illuminating the light detecting element.

During operation, each pixel has a photo-sensitive diode that is first reset by placing a charge across the photodiode. Then, the photodiode is exposed to incident light, which causes the charge stored on the photodiode to be dissipated in proportion to the intensity of the incident light. After a predetermined time period during which the photodiode is exposed to the incident light and charge is allowed to dissipate from the photo diode (i.e., the "integration" time), the charge at the node of the photodiode is read out. This valve is sampled on to a capacitor by opening a switch (i.e., a "SAMPLE" transistor).

When the time arrives to read-out the charge on the capacitor, an ADDRESS is provided to select the charge on the capacitor for read-out. After the charge on the capacitor has been read-out, the photodiode is reset by asserting a RESET signal to a reset transistor and the reset potential that is distributed across the photodiode is read-out. The amount of incident light that is detected by the photodiode is computed by subtracting the integrated voltage from the reset voltage level. This capture technique described above is known as "un-correlated double sampling," and serves to eliminate some fixed noise sources from each photodiode capture.

When determining the amount of light detected by the photodiode, noise that is generated by the switching of the reset transistor is captured during the reset of the photodiode. In addition, due to fluctuations in the power supply voltage, the reset level varies between resets. Thus, the "noise" present in the power supply also affects the reset level. As entire rows of photodiodes are reset at the same time, the noise generated affects all the photodiodes in a row. This results in each row having a different variation in noise that appears as row noise in an image. It is desirable to be able to eliminate the noise which is generated by the reset of the photodiode.

It is to be noted that although a specific architecture has been provided to describe the deficiencies in the prior art, architectures which have not been described can contain the same deficiencies. Thus, the problems described above can occur in all circuits that uses a different reset level from the level at which the photodiode begins to discharge.

It is therefore desirable to have a method and apparatus of using current pixel designs to achieve improved sensitivity and noise performance using electrical circuitry available with standard MOS fabrication processes.

DETAILED DESCRIPTION

The present invention provides a method and apparatus for reducing row reset noise in a photodiode based CMOS sensors. For purposes of explanation, specific embodiments are set forth to provide a thorough understanding of the present invention. However, it will be understood by one skilled in the art, from reading this disclosure, that the invention may be practiced without these details. Further, although the present invention is described through the use of CMOS image sensors, most, if not all, aspects of the invention apply to image sensors in general. Moreover, well-known elements, devices, process steps and the like are not set forth in detail in order to avoid obscuring the present invention.

Operation of the various embodiments of the invention will be explained using a MOS implementation of the circuits. The following short-cuts are used in this disclosure to describe various operating regions of the FET. A FET is said to be "turned off" when $V_{GS}$ (gate-source voltage)<$V_T$ (threshold voltage) for the device and the device is operating in the cut-off region where its channel acts as an open circuit. When a FET is "turned on" ($V_{GS} \geq V_T$), and $V_{DS}$ (drain-source voltage)<$V_{GS}-V_T$, the device is operating in the non-saturation region An embodiment of the invention as an imaging system 100 is shown as a logical block diagram in FIG. 1. Imaging system 100 includes a number of conventional elements, such as an optical system having a lens 104 and aperture 108 that is exposed to the incident light reflected from a scene or object 102. The optical system properly channels the incident light towards a sensor array 114 that generates sensor signals in response to an image of object 102 being formed on sensor array 114. The various control signals used in the operation of sensor array 114, such as the RESET signal, the SAMPLE signal, and the ADDRESS signal, are generated by a system controller 160. System controller 160 may include a microcontroller or a processor with input/output (I/O) interfaces that generates the control signals in response to instructions stored in a non-volatile programmable memory. Alternatively, a logic circuit that is tailored to generate the control signals with proper timing can be used. System controller 160 also acts in response to user input via a local user interface 158 (as when a user pushes a button or turns a knob of system 100) or a host/PC interface 154 to manage the operation of imaging system 100.

Figure 1:
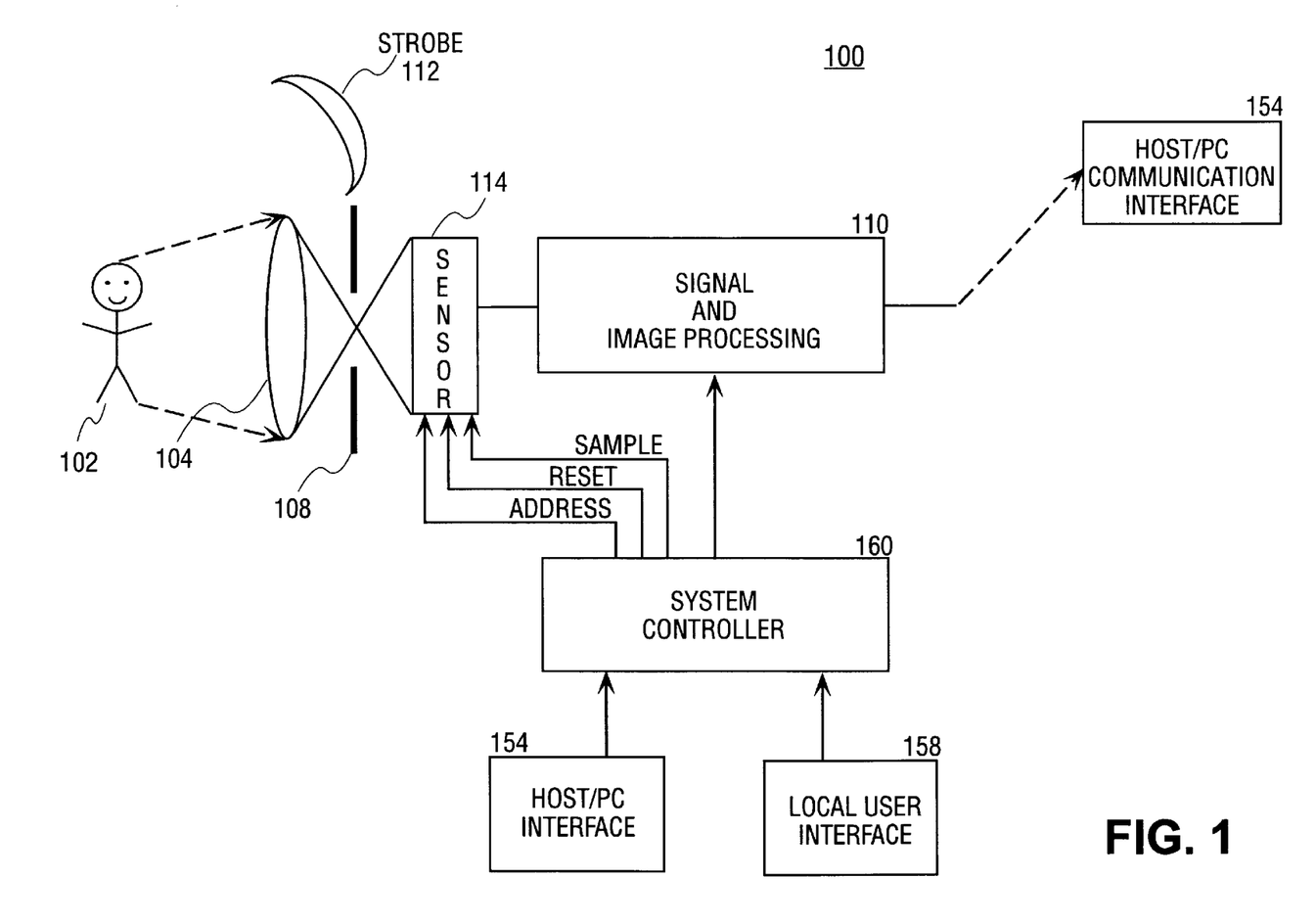
FIG. 1 is a block diagram of a digital image capture system configured in accordance with the present invention.

To obtain compressed and/or scaled images, a signal and image processing block 110 is provided in which hardware and software operates according to image processing methodologies to generate captured image data with a predefined resolution in response to receiving the sensor signals. Optional storage devices (not shown) can be used aboard system 100 for storing the captured image data. Such local storage devices may include a removable memory card. A host/Personal Computer (PC) communication interface 164 is normally included for transferring the captured image data to an image processing and/or viewing system such as a computer separate from imaging system 100. Imaging system 100 can optionally contain a display means (not shown) for displaying the captured image data. For instance, imaging system 100 may be a portable digital camera having a liquid crystal display or other suitable low power display for showing the captured image data.

Figure 2:
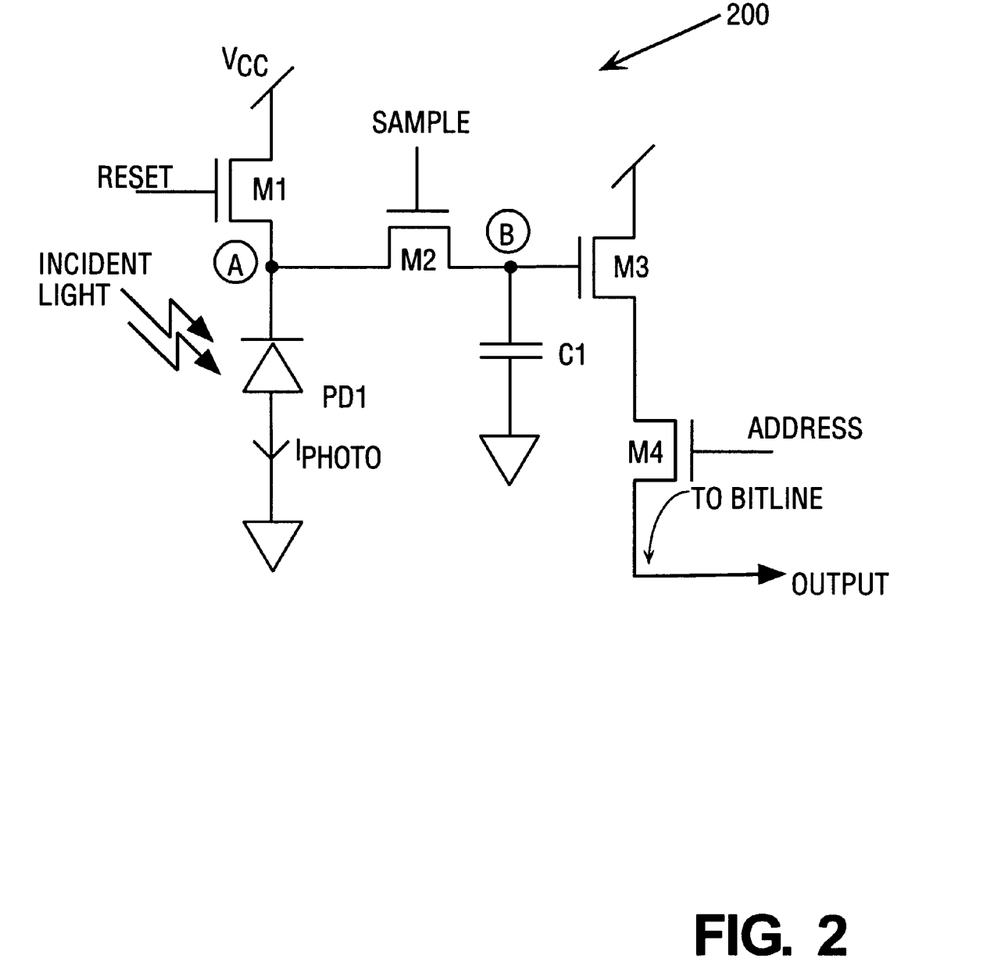
FIG. 2 illustrates a pixel circuit used in the present invention.

FIG. 2 illustrates a pixel 200 with electronic shutter that may be built using MOS fabrication processes. Pixel 200 includes a photodiode PD1 coupled to a RESET field effect transistor (FET) M1 with an electronic shutter mechanism provided by a SAMPLE transistor M2 and a storage capacitor C1. In operation, pixel 200 is reset by applying a RESET signal which causes the RESET transistor M1 to provide a low impedance path and thus reverse bias PD1. Next, a SAMPLE signal is applied to create a low impedance path between nodes A and B, thereby charging C1 to a reset level that is typically close to the rail or supply voltage $V_{CC}$, minus the threshold voltage drop across the RESET transistor M1.

As discussed, a group of pixels such as pixel 200 can be arranged in rows and columns to form sensor array 114. A column of pixels can have a common output line such that all of the pixels in the column are multiplexed to the single output line. In an alternate embodiment, the pixels in a row can be multiplexed to a single output line. In either case, the analog output lines from each column or row are fed to an analog post-processing circuit (including an analog-digital (A/D) conversion unit), such as signal and image processing block 110, which in turn provides digital signals to be further processed according to digital signal processing techniques. Signal and image processing block 110 can be part of the integrated circuit (IC) containing sensor array 114, or a different IC depending on the system implementation.

When the object or scene comes into view of sensor array 114 and the incident light is allowed to shine on PD1, node A is isolated from $V_{CC}$ by deasserting the RESET signal, and the voltage at nodes A and B begins to decay. The rate of decay is determined by the photocurrent $I_{PHOTO}$ in PD1 (caused by light-generated electron-hole pairs), by any leakage current through PD1, by the capacitance of C1 and by any parasitic leakage paths to the nodes A and B (not shown).

After a predetermined interval, known as the exposure or integration time, has elapsed from the moment node A is brought to the reset level and isolated, node B is also isolated by deasserting SAMPLE, thereby capturing a light-generated "exposed value" at node B. The capacitance of C1 is selected so that the exposed value may be held at node B until a related signal is read at the OUTPUT node.

To read the OUTPUT node, an ADDRESS signal is applied to a transistor M4 which acts as a switch to cause an output signal related to the exposed value to appear at the OUTPUT node. For purposes of discussion herein, the output signal at the OUTPUT node is proportional to the signal at node B minus the threshold voltage drop of the output transistor when the ADDRESS signal is applied to transistor M4. Thus, an output value representing the exposed value appears at the OUTPUT node when the ADDRESS signal is asserted. In another embodiment, the output signal at the OUTPUT node may be set to be a level proportionally higher than the signal at node B.

As discussed above, the voltage at node A (and, as the SAMPLE signal is applied to transistor M2, node B), begins to decay immediately after the time that the RESET signal is deasserted (i.e., the time that node A is decoupled from $V_{CC}$). The decay continues towards a saturation level, which represents the maximum intensity of light that pixel 200 can measure. Normally, the integration time elapses before saturation of pixel 200 occurs and the SAMPLE signal is deasserted from transistor M2 to "capture" the exposed value at node B.

After the exposed value has been read-out by asserting the ADDRESS signal, the RESET signal and the SAMPLE signal are applied to transistor M1 and transistor M2, respectively, so that node B is brought to a reset level. This reset value is read by asserting the ADDRESS signal to cause the reset level to appear at the OUTPUT node.

The difference between the reset value and the exposed value represents the amount of decay from the exposure of photodiode D1 to the incident light during the integration time. This difference is used to determine the intensity of the incident light. By using a difference between the exposed value and the reset value for each individual photodiode instead of a difference between the exposed value and a pre-determined, sensor-wide reset value, fixed effects caused by manufacturing differences for each pixel may be compensated.

Uncorrelated double sampling (UCDS) works by sampling both the exposed and reset values from a pixel and outputting a differential signal between the reset value and the exposed value. For an array, this function occurs on a row by row basis as there is one UCDS unit for each column of the array (not shown in FIG. 2). In a CMOS image sensor, the UCDS circuitry samples the exposed values for each pixel in an entire row of pixels after integration. It then captures the reset values of the same set of pixels in that row of pixels. The exposed value is then referenced against the reset value, forming a differential output. UCDS is effective at cancelling noise sources such as $V_T$ mismatches in the array, but noise from such sources as the power supply $V_{CC}$ may cause the exposed and reset initial conditions to be different.

Due to fluctuations in the level of $V_{CC}$ and switching noise in the operation of transistor M1, however, the reset value does not remain constant. Each time the RESET signal is asserted to obtain a reset value at node B, a different reset value will be obtained depending on the fluctuation of the power supply. Also, the noise generated by the switching of transistor M1 (i.e. KT/C noise) adds to variation in the reset value. Thus, when the row is read out, noise may appear in the read out values.

Figure 3:
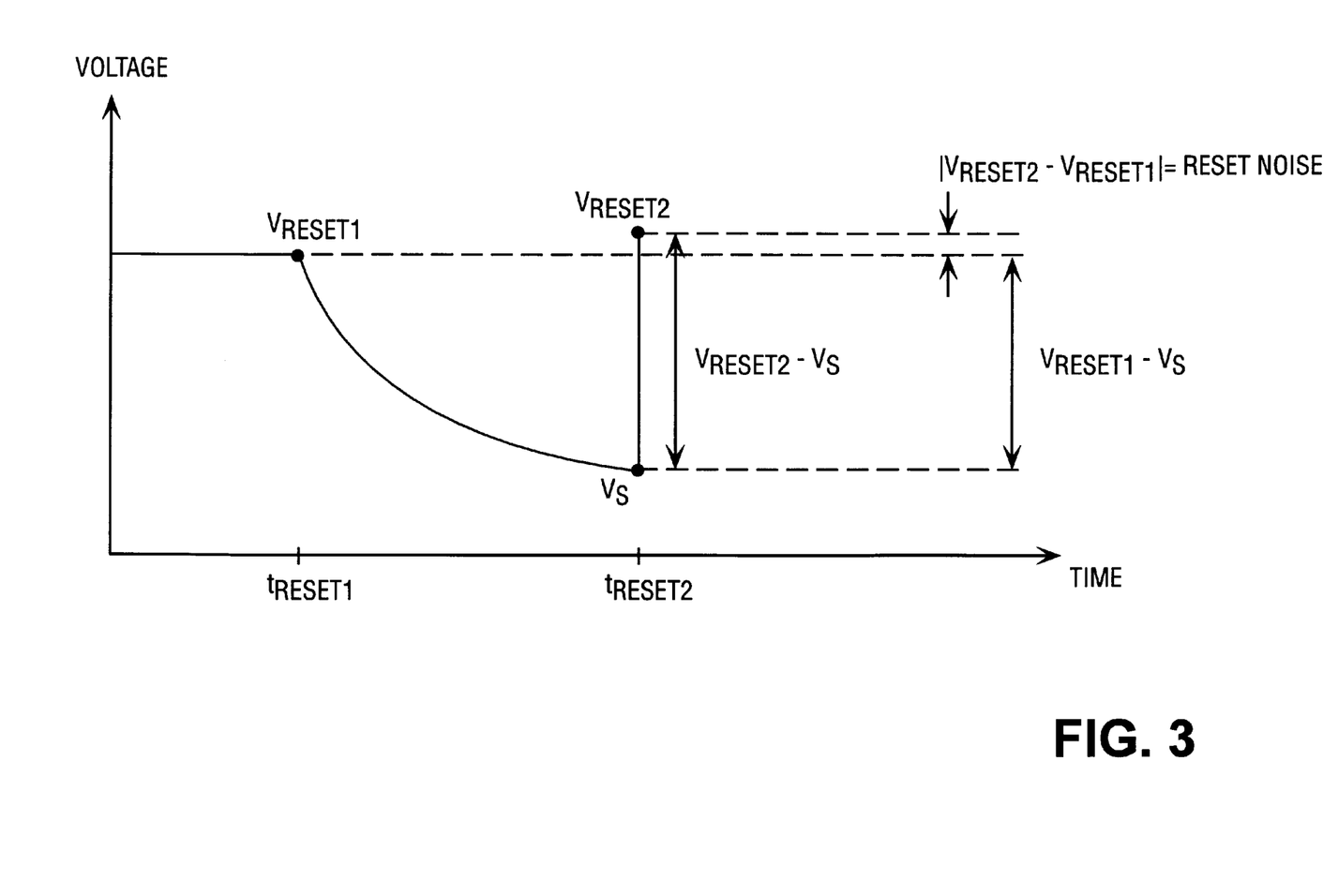
FIG. 3 is a plot of the voltage of a node in the pixel circuit of FIG. 2.

FIG. 3 is a plot of the voltage at node A over time for one cycle of the operation of pixel 200. Before time $t_{RESET1}$, where the RESET signal is provided to transistor M1, the voltage is at $V_{RESET1}$, which is approximately $V_{CC} - V_{TM1}$ (i.e., the supply voltage minus the voltage drop across transistor M1). When the SAMPLE signal is provided to transistor M2, the voltage at node B begins to track the voltage at node A. At time $t_{RESET1}$, the RESET signal is deasserted from transistor M1, and the voltage at node A begins to decay. The voltage at node B also decays as the SAMPLE signal is still asserted to transistor M2.

At time $t_{RESET2}$, the end of the integration time, the voltage at node A and B node has reached a value $V_S$ and the SAMPLE signal is deasserted from transistor M2. Thus, the sampled value $V_S$ is stored at node B (i.e., on capacitor C1). The ADDRESS signal is asserted so that the sampled value $V_S$ is read out. Shortly after the sampled value $V_S$ is read out and the ADDRESS signal is removed, the RESET signal is applied to transistor M1, and node A is brought back to a second reset voltage $V_{RESET2}$.

As described above, to determine the intensity of the incident light, $V_{RESET2}$ is read out after sampled value $V_S$ has been read out, and the difference between $V_{RESET2}$ and $V_S$ (a "differential value"), is determined. If there is no noise in pixel 200, $V_{RESET2}$ would have the same value of $V_{RESET1}$. However, due to the above described noise (i.e., the switching noise of transistor or/and the fluctuation of the power supply voltage $V_{CC}$, the value of $V_{RESET2}$ is different from $V_{RESET1}$, which produces a differential value that is different from the desired differential value of $V_{RESET1} - V_S$. The difference between $V_{RESET2}$ and $V_{RESET1}$ is the "reset noise."

In sensors where each row is independently reset, all the pixels in that row will have the same reset noise. As the RESET signal changes each time it is "sampled", each row is affected in a separate way and banding results in the final image. This would be known as "row reset noise."

One approach to eliminating the reset noise for each pixel is to use $V_{RESET1}$ instead of $V_{RESET2}$ to perform differential calculations with the sampled value $V_S$. However, in order to use this approach, $V_{RESET1}$ must be stored in an additional storage unit, or a shutter system must be employed to prevent integration while the initial reset and exposed values are read out.

The present invention provides a method and apparatus for reducing the row reset noise described above. In one approach, a reset value is stored at the start of the integration period for each row, and is read out before the sampled value for each pixel of that row is read out. A "reference pixel" is added to the sensor array for each row of pixels in order to store the initial row reset value, to determine the amount of noise on the power supply voltage, labeled $V_{CC}$ in FIG. 2 for that row during each capture. The initial row reset value contained in the reference pixel may be used to determine the noise of the power supply voltage for the row by comparing the stored reference pixel value (e.g., the initial RESET value) to the second RESET value. This noise value is accounted for in the resulting differential signal for each pixel (i.e., the difference between the sampled value and the reset value for each pixel), thereby removing the row reset noise that is caused by supply voltage variations from the image. In one approach, the timing of the non-reference pixels in sensor array 114 will remain the same as before, but the timing for the reference pixel for each row will have slightly different timing in order to be read out in time to perform pre-processing of the values contained on the reference pixel.

Figure 4:
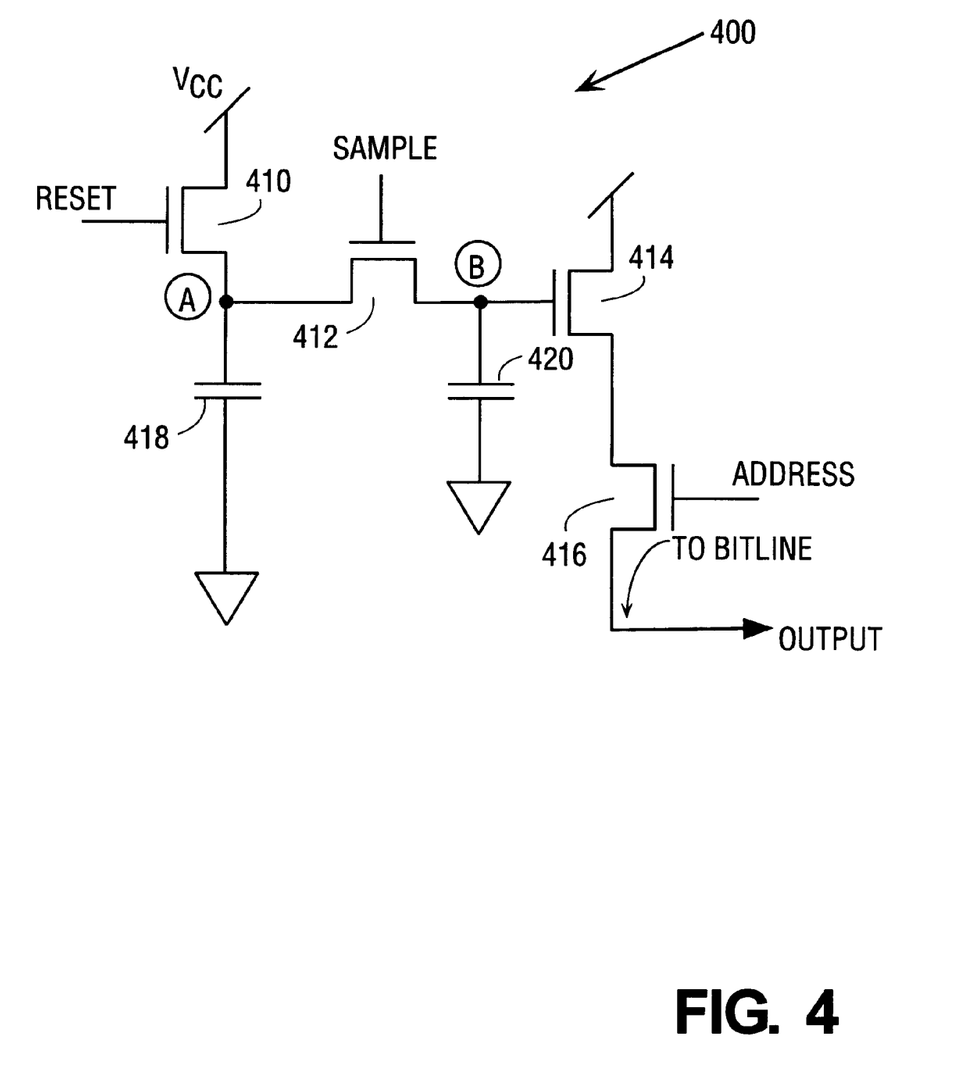
FIG. 4 illustrates a reference pixel circuit used in the present invention.

FIG. 4 is a circuit diagram of a reference pixel 400 that contains a first storage capacitor 418 in place of a photodiode. First storage capacitor 418 is coupled to RESET transistor 410 and a SAMPLE transistor 412. SAMPLE transistor 412 is used as a mechanism to allow the transfer of charge between first storage capacitor 418 and a second storage capacitor 420. A transistor 414 and an ADDRESS transistor 416 is used to allow the read-out of the value contained on second storage capacitor 420.

In operation of reference pixel 400, RESET transistor 410 of reference pixel 400 is provided a RESET signal while SAMPLE transistor 412 is provided a SAMPLE signal. Thereafter, the RESET and SAMPLE signals are deasserted from RESET transistor 410 and SAMPLE transistor 412, respectively. Thus, the first reset voltage level (i.e., $V_{RESET1}$, which is approximately $V_{CC}$), is captured on second storage capacitor 420. After, the integration period has been reached, an ADDRESS signal is provided to ADDRESS transistor 416 to read out $V_{RESET1}$. After the ADDRESS signal is deasserted, the SAMPLE signal is asserted to SAMPLE transistor 412 at approximately the same time as the RESET signal is asserted to RESET transistor 410. Second storage capacitor 420 stores the second reset voltage level (i.e., $V_{RESET2}$) to be read out when the ADDRESS signal is applied to ADDRESS transistor 416.

As discussed above, current correlated double sampling techniques use a signal related to $V_{RESET2}$ for each pixel as the reset voltage value to which the integrated value (i.e., the integrated value captured by the photodiode), is compared to arrive at a "sampled" value. However, it is more accurate to use $V_{RESET1}$ as that is the original reset voltage level from which the photodiode began to integrate charge as the noise on the power supply is not "captured" as it would be if $V_{RESET2}$ is used. As reference pixel 400 stores $V_{RESET1}$ because a storage capacitor is used in place of a photodiode (i.e., there is no integration on the charge contained at node A as a photodiode is not present, the stored $V_{RESET1}$ and the subsequently stored $V_{RESET2}$ can be used to determine the amount of noise that should be removed from the integrated values of each pixel. Thus, although each pixel has approximately the same characteristics, the $V_{RESET1}$ value for reference pixel 400 cannot be used as the $V_{RESET1}$ for all pixels. However, the noise of the power supply is similar for all the pixels on one row and can be used to adjust for the noise caused by the power supply for each pixel.

Figure 5:
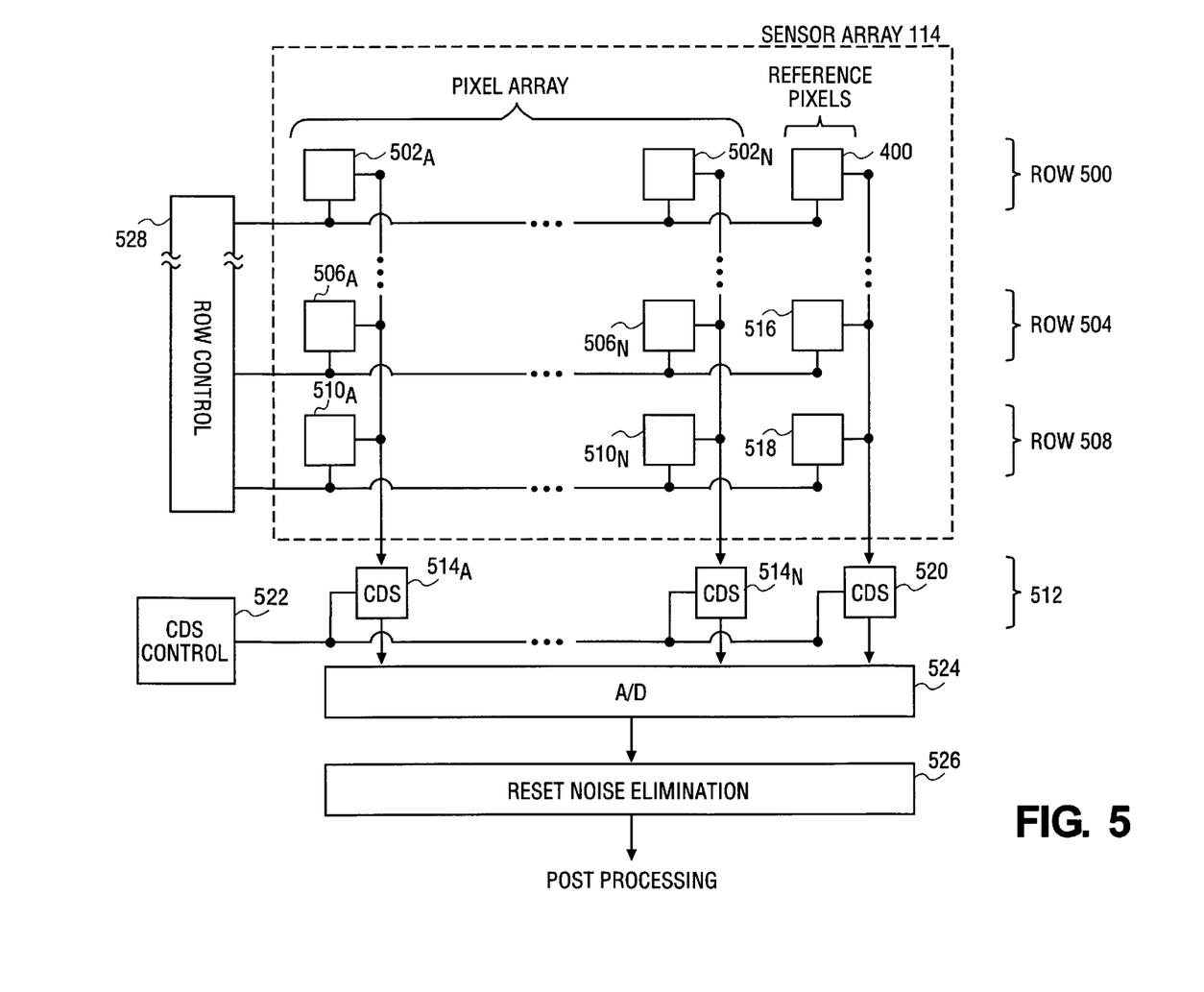
FIG. 5 is a diagram containing a sensor array configured in accordance with the present invention.

FIG. 5 is a diagram containing sensor array 114 including a set of rows of pixels (500–504, and 508). Each row of pixels contains a reference pixel for that row. For example, row 500 contains a set of pixels $502_a$ to $502_n$ along with reference pixel 400, row 504 contains a set of pixels $506_a$ to $506_n$ along with a reference pixel 516, and row 588 contains a set of pixels $510_a$ to $510_n$ along with a reference pixel 518. A row control unit 528 is used to control the operation of each row of pixels for capturing images in a pipelined fashion. Row control unit 528 provides the RESET, SAMPLE, and ADDRESS control signals to each of the pixels in sensor array 114.

Each column of pixels in sensor array 114 is coupled to a correlated double sampling (CDS) unit in a set of CDS units 512 ($514_a$ to $514_n$, and 520). For example, pixel $502_a$ is coupled to a CDS unit $514_a$. Each CDS unit in set of CDS units 512 contains a reset storage capacitor (not shown) and a sample storage capacitor (not shown) for storing a reset value and a sample value, respectively. Each CDS unit in set of CDS units 512 is controlled by a CDS control unit 522 to store and read out reset and sample values received from a respective pixel in sensor array 114.

The outputs of set of CDS units 512 is sent to an analog-to-digital (A/D) unit 524, which converts the analog signals from each of the set of CDS units 512 to a digital value. Thus, each of the sampled and reset values are converted from an analog signal to a digital value, and subsequently fed into a reset noise elimination unit 526. Once the reset noise elimination unit 526 receives the reset and sample values from each of the CDS units in set of CDS units 512, reset noise elimination unit 526 calculates the noise generated from the power supply for each row through the use of the sample and reset values (i.e., $V_{RESET1}$ and $V_{RESET2}$, respectively), of the reference pixels of the corresponding row. Once an adjustment is determined through the use of $V_{RESET1}$ and $V_{RESET2}$, the output from each of the pixels in that row can be corrected to substantially remove the effects of power supply noise.

In another embodiment, more than one reference pixel is used for each row of sensor array 114. In this embodiment, the noise detected by each reference pixel for a row may be averaged to obtain a more accurate representation of detected noise for the row.

Figure 6:
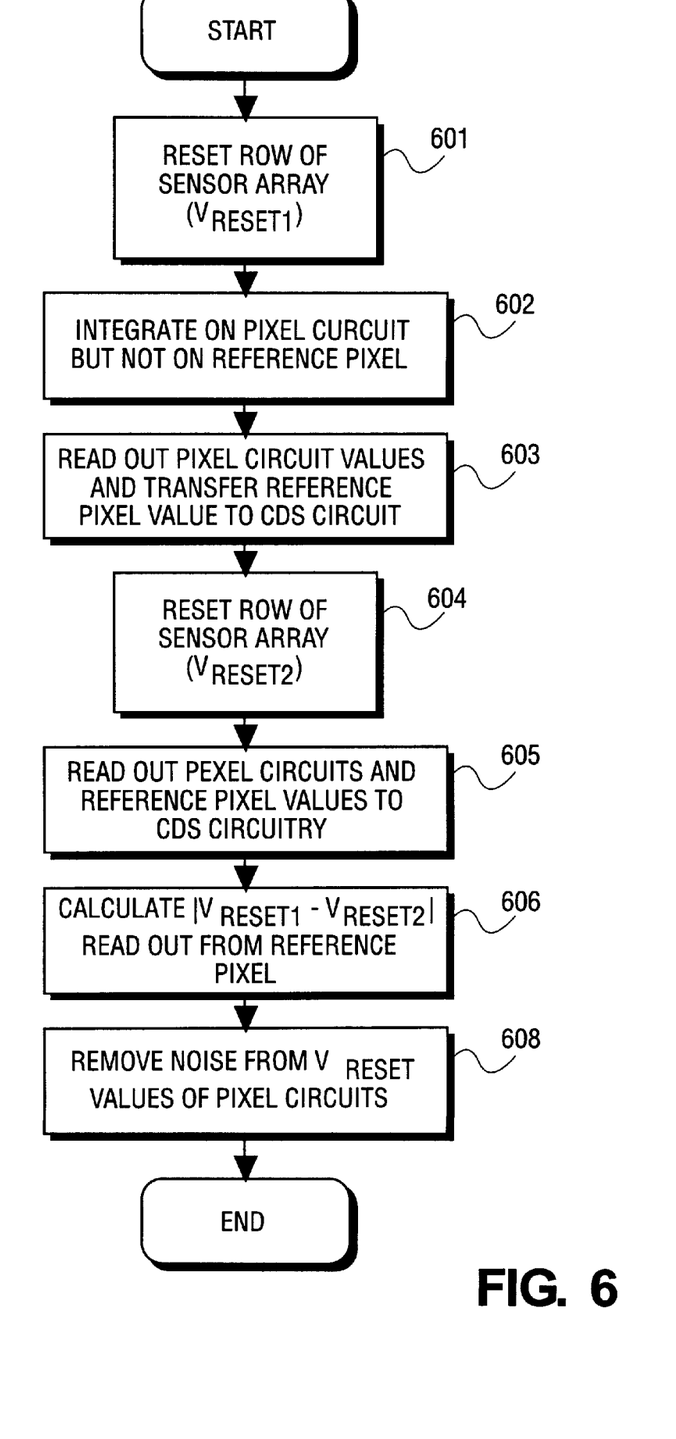
FIG. 6 is a flow diagram of the operation of a row of pixels of FIG. 5 including the reference pixel circuit of FIG. 4 in accordance with one embodiment of the present invention.

FIG. 6 is a flow diagram of the operation of a row 500 of pixels of sensor array 114, which includes reference pixel 400.

In Step 601, row 500 of sensor array 114 is reset to a value of $V_{RESET}$ (as depicted in FIG. 3). In Step 602, while pixels $502_a$ to $502_n$ in sensor array 114 are integrating the incident light, reference pixel 400 does not. Thus, the value $V_{RESET1}$ is stored on capacitor 418 and capacitor 420, and does not change during integration. The signal value for reference pixel 400 is therefore $V_{RESET1}$. In Step 603, while the signal values for row 500 of sensor array 114 are read out, reference pixel 400 transfers its $V_{RESET1}$ to sample value storage capacitor (not shown) in CDS circuit 520. In Step 604, when the row that was just read out is reset to a value $V_{RESET2}$, its respective reference pixel is also reset to the value $V_{RESET2}$. In Step 605, the value $V_{RESET2}$ for all pixels in a row, including reference pixel 400, is transferred to a reset capacitor (not shown) in the CDS circuitry. In Step 606, when set of CDS circuitry 512 calculates the differential signal for row 500 of sensor array 114, it first calculates the difference between $V_{RESET1}$ and $V_{RESET2}$ read out from reference pixel 400, which is the noise on the power supply. In step 608, this noise value, $V_{RESET2}-V_{RESET1}$ in FIG. 3, is subtracted from the differential output from each pixel $502_a$ to $502_n$. This gives the true, noise free signal $V_{RESET1}-V_S$ as the output.

The embodiments of the invention described above are, of course, subject to other variations in structure and implementation. For instance, pixel 200 features transistors whose dimensions may be selected by one skilled in the art in order to achieve proper circuit operation as described above while minimizing power consumption. Also, the value of the storage capacitor may also be selected by one skilled in the art so as to provide the desired trade off between sensitivity and noise immunity, with lower capacitance yielding higher sensitivity but lower noise immunity. The integration time can also be varied so as to yield the desired trade off between pixel resolution and image frame rate. Therefore, the scope of the invention should be determined not by the embodiments illustrated but by the appended claims and their legal equivalents.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. An apparatus comprising:
   a plurality of sets of pixels, each pixel having a photodetector coupled to a reset gate, the reset gate being coupled to receive a reset signal;
   a plurality of reference pixels each being associated with a respective one of said plurality of sets of pixels, and each reference pixel being coupled to receive the reset signal;
   a set of correlated double sampling units coupled to said plurality of sets of pixels and said plurality of reference pixels;
   an analog to digital converter unit coupled to said set of correlated double sampling units; and
   a reset noise elimination unit coupled to said analog to digital converter unit, to adjust a set of pixel values derived from one of the plurality of sets of pixels with an adjustment value derived from an associated one of the plurality of reference pixels.

2. The apparatus of claim 1, where said reference pixels are configured to be substantially unaffected by incident light.

3. The apparatus of claim 1, where each of said reference pixels comprises:
   a first storage capacitor coupled to a reset gate and a sample gate, and
   a second storage capacitor coupled to said sample gate and an output gate.

4. The apparatus of claim 1 wherein each of the plurality of sets of pixels is arranged as a row.

5. An apparatus comprising:
   an image sensor having a plurality of reference pixels each being associated with a respective one of said plurality of sets of pixels, and each reference pixel being coupled to receive the reset signal;
   a set of correlated double sampling units coupled to said plurality of sets of pixels and said plurality of reference pixels;
   an analog to digital converter unit coupled to said set of correlated double sampling units; and
   a reset noise elimination unit coupled to said analog to digital converter unit, to adjust a set of pixel values derived from one of the plurality of sets of pixels with an adjustment value derived from an associated one of the plurality of reference pixels; and, a controller coupled to said image sensor to provide the reset signals.

6. The apparatus of claim 5, where said plurality of reference pixels are configured to be substantially unaffected by incident light.

7. The apparatus of claim 5, where each of said reference pixels comprises:

a first storage capacitor coupled to a reset gate and a sample gate, and a second storage capacitor coupled to said sample gate and an output gate.

8. A method comprising:

(a) providing a first reset signal to a set of pixels and a reference pixel, said first reset signal producing a first reference value in the reference pixel;

(b) reading out a first set of values generated in response to incident light from said set of pixels following an integration interval;

(c) reading out the first reference value from said reference pixel;

(d) providing a second reset signal to said set of pixels and said reference pixel, said second reset signal producing a second reference value in the reference pixel and a second set of values in the set of pixels;

(e) reading out the second set of values from said set of pixels and the second reference value from said reference pixel;

(f) generating an adjustment value using said first reference value and said second reference value;

(g) generating a set of pixel values using said first set of values and said second set of values; and (h) adjusting said set of pixel values using said adjustment value.

9. The method of claim 8, where said generating of said adjustment value comprises determining the difference between said first reference value and said second reference value.

10. The method of claim 9, where said generating of said set of pixel values comprise determining the difference between each value in said first set of values and a respective value in said second set of values.

11. The method of claim 8, where said first reference value is substantially equal to a value of said first reset signal.

12. The method of claim 8, where said second reference value is substantially equal to a value of said second reset signal.

13. The method of claim 8 further comprising:

converting said set of pixel values and said adjustment value from analog form into digital form prior to adjusting said set of pixel values.

14. The method of claim 8 further comprising:

repeating (a)–(h) for each one of a plurality of rows of an image sensor.

* * * * *